US011001196B1

(12) United States Patent
Alexander

(10) Patent No.: US 11,001,196 B1
(45) Date of Patent: May 11, 2021

(54) SYSTEMS AND METHODS FOR COMMUNICATING A MACHINE INTENT

(71) Applicant: Direct Current Capital LLC, Wilmington, DE (US)

(72) Inventor: Chip J. Alexander, Belmont, CA (US)

( * ) Notice: Subject to any disclaimer, the term of this patent is extended or adjusted under 35 U.S.C. 154(b) by 0 days.

(21) Appl. No.: 16/455,524

(22) Filed: Jun. 27, 2019

Related U.S. Application Data

(60) Provisional application No. 62/690,873, filed on Jun. 27, 2018.

(51) Int. Cl.
| | |
|---|---|
| *B60Q 1/50* | (2006.01) |
| *G05D 1/00* | (2006.01) |
| *B60W 40/04* | (2006.01) |
| *G06K 9/00* | (2006.01) |
| *G08G 1/01* | (2006.01) |

(52) U.S. Cl.
CPC .............. *B60Q 1/50* (2013.01); *B60W 40/04* (2013.01); *G05D 1/0088* (2013.01); *G06K 9/00825* (2013.01); *G08G 1/0133* (2013.01); *B60W 2555/60* (2020.02); *G05D 2201/0213* (2013.01)

(58) Field of Classification Search
CPC .... B60Q 1/50; G06K 9/00825; G08G 1/0133; B60W 40/04; B60W 2555/60; G05D 1/0088; G05D 2201/0213
See application file for complete search history.

(56) References Cited

U.S. PATENT DOCUMENTS

| | | | |
|---|---|---|---|
| 2,190,123 | A | 2/1940 | Pace |
| 7,095,318 | B1 | 8/2006 | Bekhor |
| 7,844,394 | B2 | 11/2010 | Kim |
| 7,647,180 | B2 | 12/2010 | Breed |
| 7,924,146 | B2 | 4/2011 | Seder et al. |
| 8,269,652 | B2 | 9/2012 | Seder et al. |
| 8,514,100 | B2 | 8/2013 | Yamashita |

(Continued)

FOREIGN PATENT DOCUMENTS

EP        1912157        4/2008

OTHER PUBLICATIONS

Trivedi et al., Holistic Sensing and Active Displays for Intelligent Diver Support Systems, 2007, IEEE, p. 60-68.

(Continued)

*Primary Examiner* — Daryl C Pope
(74) *Attorney, Agent, or Firm* — Polsinelli

(57) ABSTRACT

Systems and methods communicate an intent of an autonomous vehicle externally. In one implementation, traffic object(s) approaching an intersection towards which an autonomous vehicle autonomously navigates along a travel path is tracked. A position of the traffic object(s) relative to the intersection is determined when the autonomous vehicle is stopped at the intersection. A perceived possession of a right of way of the autonomous vehicle to enter the intersection is generated based on the position of the traffic object(s). A decision of whether to direct the autonomous vehicle into the intersection is generated based on the perceived possession of the right of way. An intent icon linked to an action of the autonomous vehicle is generated. The action is correlated with the decision of whether to direct the autonomous vehicle into the intersection. The intent icon is presented to an environment external to the autonomous vehicle.

33 Claims, 6 Drawing Sheets

(56) References Cited

U.S. PATENT DOCUMENTS

| | | |
|---|---|---|
| 8,849,494 B1 | 9/2014 | Herbach |
| 8,996,224 B1 | 3/2015 | Herbach |
| 9,196,164 B1 | 11/2015 | Urmson et al. |
| 9,336,436 B1 | 5/2016 | Dowdall |
| 9,336,446 B2 | 5/2016 | Buchanan et al. |
| 9,428,186 B2 | 8/2016 | Breed |
| 9,535,423 B1 | 1/2017 | Debreczeni |
| 9,654,738 B1 | 5/2017 | Ferguson |
| 9,718,405 B1 | 8/2017 | Englander et al. |
| 9,829,889 B1 | 11/2017 | Kusano et al. |
| 9,849,784 B1 | 12/2017 | Chan |
| 9,870,703 B2 | 1/2018 | MacNeille et al. |
| 9,881,503 B1 | 1/2018 | Goldman-Shenhar et al. |
| 9,884,585 B1 | 2/2018 | Lubbers |
| 9,902,311 B2 | 2/2018 | Sweeney |
| 9,954,252 B2 | 4/2018 | Ogihara et al. |
| 9,994,148 B1 | 6/2018 | Kim |
| 10,053,001 B1 | 8/2018 | Nabbe et al. |
| 10,118,548 B1 | 11/2018 | Fields et al. |
| 10,134,280 B1 * | 11/2018 | You .................. B60Q 1/34 |
| 10,196,058 B2 | 2/2019 | Paris et al. |
| 10,261,513 B2 | 4/2019 | Reiley et al. |
| 10,262,528 B2 | 4/2019 | Fields et al. |
| 10,317,907 B2 | 6/2019 | Shami |
| 2003/0023370 A1 | 1/2003 | Millington et al. |
| 2003/0147247 A1 | 8/2003 | Koike |
| 2004/0193347 A1 | 9/2004 | Harumoto |
| 2005/0117364 A1 | 6/2005 | Rennick et al. |
| 2007/0277100 A1 | 11/2007 | Sheha et al. |
| 2008/0161986 A1 | 7/2008 | Breed |
| 2009/0069977 A1 | 3/2009 | Markyvech |
| 2010/0082251 A1 | 4/2010 | Kogure |
| 2010/0328055 A1 | 12/2010 | Fong et al. |
| 2011/0046835 A1 | 2/2011 | Taguchi |
| 2011/0090093 A1 | 4/2011 | Grimm et al. |
| 2011/0184617 A1 | 7/2011 | Hegemann et al. |
| 2011/0199199 A1 | 8/2011 | Perkins |
| 2011/0234422 A1 | 9/2011 | Yamashita |
| 2012/0083960 A1 | 4/2012 | Zhu et al. |
| 2012/0242479 A1 | 9/2012 | Ghazarian et al. |
| 2012/0310465 A1 | 12/2012 | Boatright |
| 2013/0265791 A1 | 10/2013 | Dassanayake et al. |
| 2013/0345900 A1 | 12/2013 | Usui |
| 2014/0268353 A1 | 9/2014 | Fujimura et al. |
| 2014/0365126 A1 | 12/2014 | Vulcano et al. |
| 2015/0066284 A1 | 3/2015 | Yopp |
| 2015/0151725 A1 | 6/2015 | Clarke et al. |
| 2015/0183430 A1 | 7/2015 | Schwindt et al. |
| 2015/0332114 A1 | 11/2015 | Springer |
| 2015/0336502 A1 * | 11/2015 | Hillis .................. G06F 3/017 701/23 |
| 2016/0003636 A1 | 1/2016 | Ng-Thow-Hing |
| 2016/0040997 A1 | 2/2016 | Otani |
| 2016/0061613 A1 | 3/2016 | Jung et al. |
| 2016/0068099 A1 | 3/2016 | Peterson et al. |
| 2016/0207443 A1 | 7/2016 | Widdowson et al. |
| 2016/0231746 A1 | 8/2016 | Hazelton et al. |
| 2016/0355192 A1 | 12/2016 | James |
| 2016/0375900 A1 | 12/2016 | Laur et al. |
| 2017/0193384 A1 * | 7/2017 | Mudalige .............. G08G 1/166 |
| 2017/0217368 A1 | 8/2017 | Lewis |
| 2017/0240096 A1 * | 8/2017 | Ross .................. G08G 1/0955 |
| 2017/0240098 A1 * | 8/2017 | Sweeney ................ B60Q 1/50 |
| 2017/0243490 A1 | 8/2017 | Leppanen et al. |
| 2017/0270374 A1 | 9/2017 | Myers et al. |
| 2017/0277192 A1 | 9/2017 | Gupta et al. |
| 2018/0072218 A1 | 3/2018 | Sweeney |
| 2018/0194280 A1 | 7/2018 | Shibata et al. |
| 2018/0276986 A1 | 9/2018 | Delp |
| 2018/0286232 A1 | 10/2018 | Shau |
| 2018/0329418 A1 * | 11/2018 | Baalke .................. G08G 1/166 |
| 2018/0334089 A1 * | 11/2018 | Huang .................. B60Q 5/006 |
| 2019/0118810 A1 | 4/2019 | Paris et al. |
| 2019/0196482 A1 | 6/2019 | Reiley et al. |
| 2019/0265703 A1 * | 8/2019 | Hicok .................. G05B 13/027 |
| 2020/0001779 A1 * | 1/2020 | Alexander ........... G05D 1/0088 |
| 2020/0005645 A1 * | 1/2020 | Wray ............... G08G 1/096758 |
| 2020/0017106 A1 * | 1/2020 | Park .................. B60Q 9/00 |
| 2020/0114812 A1 * | 4/2020 | Imaishi .................. B60Q 1/26 |
| 2020/0114813 A1 * | 4/2020 | Lujan .................. B60W 10/18 |

OTHER PUBLICATIONS

Ng-Thow-Hing et al., User-centered perspectives for automotive augmented reality, 2013, IEEE, p. 13-22.

Mueller et al., "Object-related-navigation for mobile robots," 2012, IEEE, p. 603-610.

Wang et al., "Steering behaviors for autonomous vehicles in virtual environments," 2005, IEEE, p. 155-162.

Willemesen et al., "Ribbon networks for modeling navigable paths of autonomous agents in virtual environments," 2006, IEEE, p. 331-342.

Sotelo et al., "Vision-based navigation system for autonomous urban transport vehicles in outdoor environments," 2002, IEEE, p. 52-57.

Waxman et al., "A visual navigation system for autonomous land vehicles," 1987, IEEE, p. 124-141.

"Nissan IDS Concept: Nissan's vision for the future of EVs and autonomous driving," Oct. 27, 2015, http://nissannews.com/en-US/nissan/usa/releases/nissan-ids-concept-nissan-s-vision-for-the-future-of-evs-and-autonomous-driving, accessed Sep. 14, 2016.

O'Malley et al., "Rear-Lamp Vehicle Detection and Tracking in Low-Exposure Color Video for Night Conditions," *IEEE Transactions on Intelligent Transportation Systems*, vol. 11, No. 2, Jun. 2010, pp. 453-462.

* cited by examiner

SYSTEMS AND METHODS FOR COMMUNICATING A MACHINE INTENT

CROSS-REFERENCE TO RELATED APPLICATIONS

The present application claims benefit of priority to U.S. Provisional Patent Application No. 62/690,873, entitled "Method for Communicating an Intent of an Autonomous Vehicle" and filed on Jun. 27, 2018, which is specifically incorporated by reference herein in its entirety.

FIELD

Aspects of the present disclosure relate to systems and methods for communicating a machine intent and more particularly to communicating an intended action of an autonomous vehicle to an external environment of the autonomous vehicle based on a perceived possession of a right of way.

BACKGROUND

Operators of machines, such as vehicles, often rely on behavior gestures and cues from other operators or persons in an environment of the machine to determine appropriate next actions, particular in contexts where operation of one machine affects the operation of another machine. For example, when drivers of a vehicle approach a traffic intersection, such as a four-way stop, the drivers typically make eye contact or otherwise scrutinize the behavior of the driver and her operation of the vehicle to infer the intent of the driver to enter the intersection. Autonomous machines, such as autonomous vehicles, operate to transport an occupant(s) through a series of autonomous decisions with limited to no input from the occupants beyond simply inputting a destination point. However, it is challenging for the autonomous vehicle to autonomously determine actions in contexts heavily involving behavioral communications and communicate an intent regarding such actions in those contexts. It is with these observations in mind, among others, that various aspects of the present disclosure were conceived and developed.

SUMMARY

Implementations described and claimed herein address the foregoing problems by providing systems and methods for communicating an intent of an autonomous vehicle externally. In one implementation, traffic object(s) approaching an intersection towards which an autonomous vehicle autonomously navigates along a travel path is tracked. A position of the traffic object(s) relative to the intersection is determined when the autonomous vehicle is stopped at the intersection. A perceived possession of a right of way of the autonomous vehicle to enter the intersection is generated based on the position of the at least one traffic object relative to the intersection when the autonomous vehicle is stopped at the intersection. A decision of whether to direct the autonomous vehicle into the intersection is generated based on the perceived possession of the right of way. An intent icon linked to an action of the autonomous vehicle is generated. The action is correlated with the decision of whether to direct the autonomous vehicle into the intersection. The intent icon is presented to an environment external to the autonomous vehicle using a presentation system. The intent icon is presented proportional to a confidence of the perceived possession of the right of way, and the intent icon communicates the action of the autonomous vehicle to the environment external to the autonomous vehicle.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and method for communicating an autonomous machine, such as an autonomous vehicle, externally to an environment external to the autonomous machine. Generally, a communication system generates an interface for communicating an intent of the autonomous machine to traffic objects. In one aspect, as an autonomous vehicle moves towards an intersection, traffic objects approaching or otherwise around the intersection are tracked. When the autonomous vehicle stops at the intersection, a position of each of the traffic objects are determined relative to the intersection. The autonomous vehicle generates a perceived possession of a right of way of the autonomous vehicle to enter the intersection based on the positions of the traffic objects when the autonomous vehicle is stopped at the intersection, behavioral parameters of the traffic objects, traffic regulations applicable to the intersection, and/or the like. Based on the perceived possession of the right of way, the autonomous vehicle autonomously generates a decision regarding whether to enter the intersection.

To communicate the intent of the autonomous vehicle to enter the intersection or remained stopped at the intersection, the autonomous vehicle generates an intent icon linked to the intended action. The intent icon is presented to the external environment proportional to a confidence of the perceived possession of the right of way and communicating the intended action, which may include an intent to enter the intersection, a next step in a route following traversal of the intersection, and/or other intended actions. Following or otherwise in connection with the presentation of the intent icon, the autonomous vehicle autonomously executes the intended actions. Based on any changes within the environment of the autonomous vehicle, such as another traffic object entering the intersection, regardless of proper possession of a right of way, the autonomous vehicle may respond to address the changed condition and communicate an intent icon accordingly.

The various systems and methods disclosed herein generally provide for communicating an intent of an autonomous machine. The example implementations discussed herein reference generating and presenting an intent icon to communicate an intent of an autonomous vehicle, including underlying decisions and actions, to an environment external to the autonomous vehicle. However, it will be appreciated by those skilled in the art that the presently disclosed technology is application in other human machine interface contexts and to other manned and unmanned autonomous machines, including, without limitation, terrestrial vehicles, aerial vehicles, aerospace vehicles, submersible vehicles, and/or the like. The presently disclosed technology may be further applicable to other types of machines and user devices, such as a personal computer, workstation, mobile device, or other computing devices.

Figure 1:
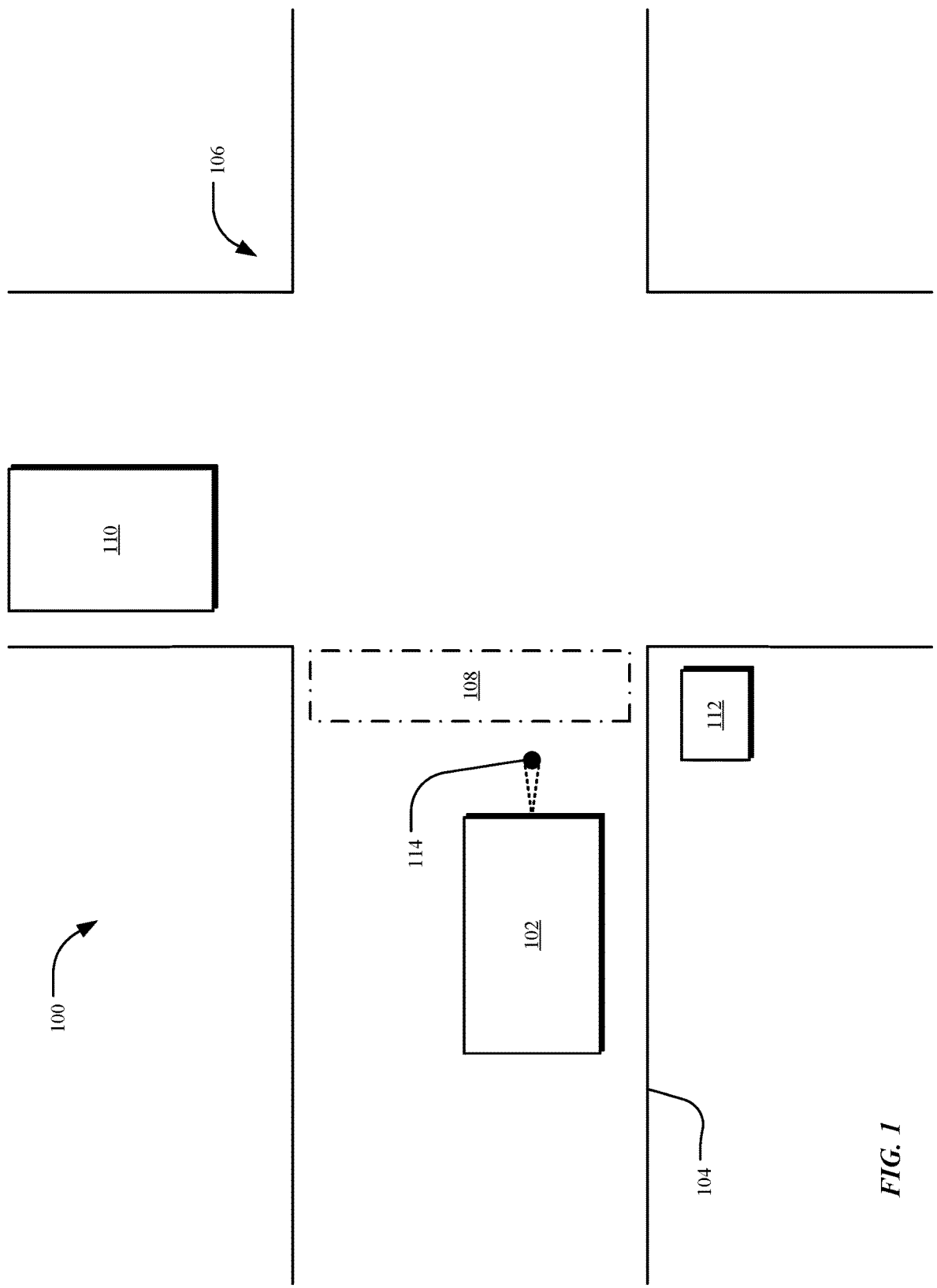
FIG. 1 is a diagram of an example environment for communicating an intent of an autonomous vehicle to an environment external to the autonomous vehicle.
Figure 2:
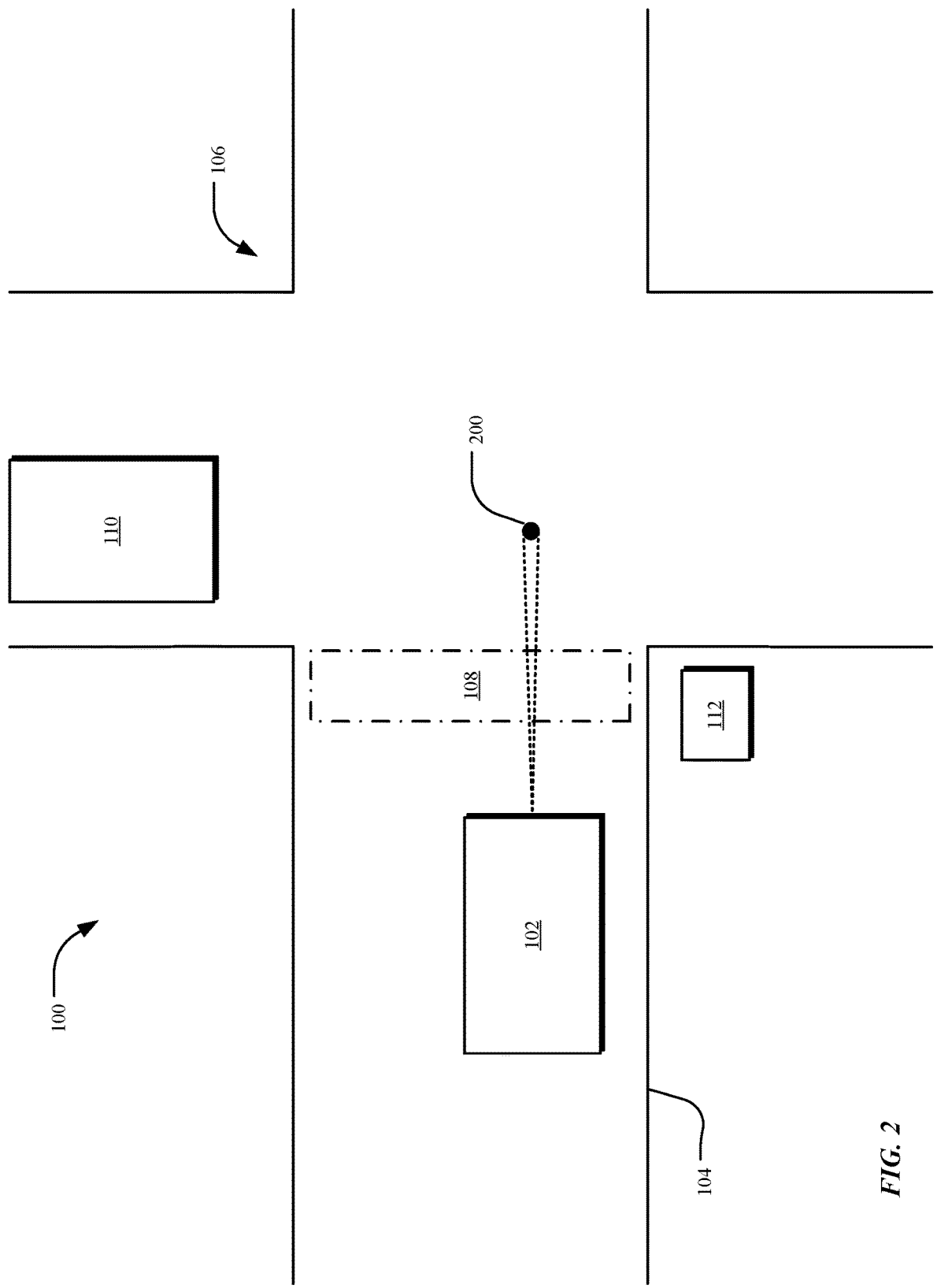
FIG. 2 is a diagram of the environment for communicating the intent of an autonomous vehicle to the environment external to the autonomous vehicle, with the intent including a perceived possession of a right of way of the autonomous vehicle to enter the intersection.
Figure 3:
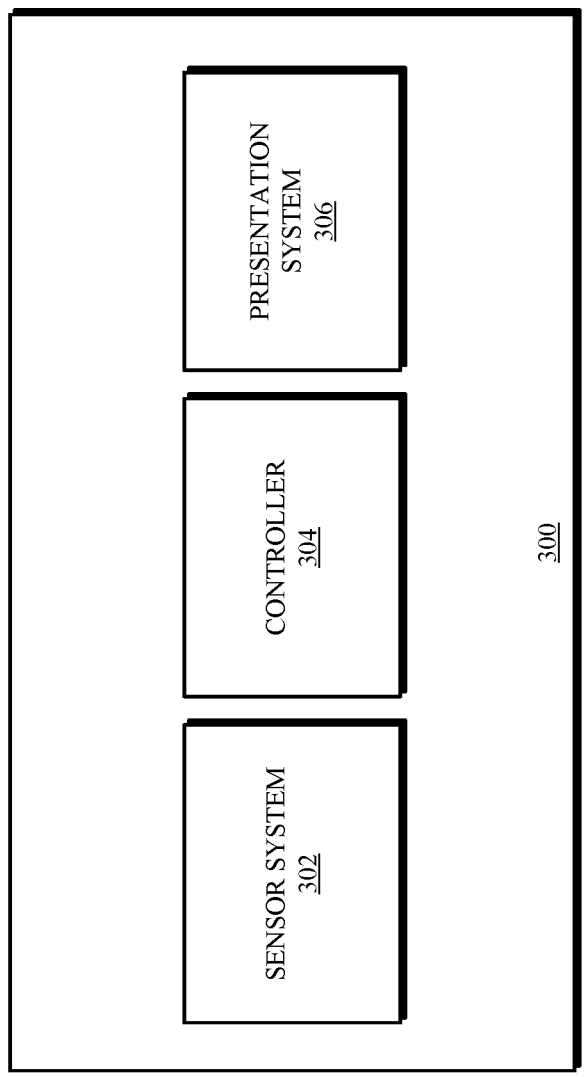
FIG. 3 is a diagram of an example intent communication system for communicating an intent of an autonomous vehicle.

For a detailed description of an example environment 100 for communicating an intent of an autonomous vehicle 102 to an environment external to the autonomous vehicle 102 using an intent communication system 300, reference is made to FIGS. 1-3. In one implementation, the autonomous vehicle 102 is autonomously navigating along a route and moving on a travel path 104 along the route. The autonomous vehicle 102 is capable of operating to move along the travel path 104 with limited input from occupants within an interior of the autonomous vehicle 102. Stated differently, rather than the user having an operational engagement with the autonomous vehicle 102 to control its actions, the occupant may simply input a destination point or other instruction and the autonomous vehicle 102 transports the occupant through a series of autonomous decisions. As a result, other traffic objects in the external environment, including without limitation, operators of vehicles, pedestrians, operators of personal vehicles (e.g., bicyclists, skateboarders, operators of scooters, etc.), and/or the like, may not have knowledge of actions planned or being executed by the autonomous vehicle 102 and how those actions may affect the traffic objects. For example, when the autonomous vehicle 102 is at or near an intersection, such as a traffic intersection 106, a crosswalk 108, a parking space, etc., where one or more travel paths intersect the travel path 104 of the autonomous vehicle 102, traffic objects (e.g., vehicle 110 and pedestrian 112) may not know whether the autonomous vehicle 102 intends to enter the intersection or wait for another traffic object to traverse the intersection.

To facilitate communication of the intent of the autonomous vehicle 102 in such contexts, the intent communication system 300 of the autonomous vehicle 102 includes a sensor system 302, a vehicle controller 304, and a presentation system 306. The sensor system 302 may be mounted on or otherwise deployed in the autonomous vehicle 102, and the presentation system 306 may be mounted on or otherwise deployed in the autonomous vehicle 102 to communicate to the external environment of the autonomous vehicle 102. In some implementations, the presentation system 306 may be part of a mobile device carried by users or deployed in traffic objects and in communication with the vehicle controller 304 for communicating intent of the autonomous vehicle 102 to users, such as current, past, and/or future occupants and other traffic objects.

In one implementation, the autonomous vehicle 102 navigates towards an intersection, such as the traffic intersection 106, which contains streets or other travel paths intersecting the travel path 104 that are governed by traffic regulations (e.g., a traffic intersection with stop signs, a traffic intersection with stop lights, a traffic intersection with a roundabout, a traffic intersection with a yield sign or merge lane, etc.), or the crosswalk 108, which defines a designated path for pedestrians and approved personal vehicles to cross the travel path 104 according to traffic regulations. As the autonomous vehicle 102 navigates towards the traffic intersection 106 and the crosswalk 108, the scanning system 302 scans a field around the travel path 104 to detect traffic objects within the field based on captured scan data. The autonomous vehicle 102 tracks any detected traffic objects, such as the traffic objects 110 and 112, which are approaching or otherwise near the traffic intersection 106 or the crosswalk 108. The vehicle controller 304 determines a position of the traffic objects 110 and 112 relative to the intersections 106 and 108. In the example shown in FIG. 1, the vehicle controller 304 may determine that the vehicle 110 is stopped at the traffic intersection 106 following its arrival at the traffic intersection at a time after the autonomous vehicle 102 vehicle arrived and stopped at the traffic intersection. In this example, the vehicle controller 304 may further determine that the pedestrian 112 was located at the crosswalk 112 prior to the arrival of the autonomous vehicle 102 to the crosswalk 108.

Based on the positions of the traffic objects 110 and 112 when the autonomous vehicle 102 is stopped at the corresponding intersections 106 and 108, the vehicle controller 304 generates a perceived right of way of the autonomous vehicle 102 to enter each of the intersections 106 and 108. In the example of FIG. 1, where the traffic intersection 106 includes a four-way stop with stop signs, traffic regulations may mandate that: the vehicle arriving at the traffic intersection 106 first has the right of way; if the vehicles arrive at the same time, the vehicle positioned to the right has the right of way; and whenever the right of way is unclear, operators of vehicles are encouraged to make eye contact with the other operators or utilize other behavior cues to determine which vehicle will enter the traffic intersection 106 first. Similarly, in the context of the crosswalk 108, traffic regulations may mandate that vehicles yield to pedestrians waiting at or otherwise in or at the crosswalk 108. However, some pedestrians may loiter near the crosswalk 108 with no intention to enter the crosswalk 108. In such contexts, operators of vehicles make eye contact with the pedestrians or utilize other behavior cues to determine whether the pedestrian intends to enter the crosswalk 108. Thus, in one implementation, the vehicle controller 304 generates a perceived right of way of the autonomous vehicle 102 to enter each of the intersections 106 and 108 based on the positions of the traffic objects 110 and 112 relative to the respective intersections 106 and 108, as well as on an object type and a behavior profile associated with the object type of each of the traffic objects 110 and 112.

The object type of each of the traffic objects 110 and 112 may be determined by comparing the scan data to a plurality of known objects through object detection and identification techniques. For example, the vehicle controller 304 may identify the traffic object 110 as another vehicle and the traffic object 112 as an adult pedestrian. A set of behavior profiles corresponding to each object type are obtained and compared to behavior data extracted from the scan data to associate one or more behavioral parameters, such as orientation, position, motion, gesture, etc., with the traffic objects 110 and 112. The behavior parameters may each correspond to an estimated intent of entering an intersection. For example, where the vehicle 110 is unmoving at the traffic intersection 106 and the driver is looking in the direction of the autonomous vehicle 102 or a direction other than along its travel path into the traffic intersection 106, such behavior parameters may indicate an intent of the vehicle 110 to wait at the traffic intersection 106, with the autonomous vehicle 102 having the right of way. Similarly, even though the pedestrian 112 arrived at the crosswalk 108 first and is positioned next to the crosswalk 108, where the pedestrian 112 is unmoving and oriented in a direction away from the crosswalk 108 and/or gestures to the autonomous vehicle 102 to proceed through the crosswalk 108, such behavior parameters may indicate an intent of the adult pedestrian 112 to wait at the crosswalk 108, with the autonomous vehicle 102 having the right of way. It will be appreciated that different behavior profiles for various object types may associate different behavior parameters with a variety of intents.

In one implementation, the perceived possession of the right of way is generated based on a comparison of a possession score to a threshold. The possession score may be calculated by weighting the positions of the traffic objects and behavior parameters of the traffic objects determined based on the object type and associated behavior profiles. Such weighting may correspond to a degree to which each such factor indicates a likelihood of the traffic object to enter an intersection. Further, the possession score may be calculated based on applicable traffic regulations or social constructions that dictate right of way possession. The possession score decreases where the traffic regulations dictate that another traffic object is entitled to the right of way and/or where the behavior parameters indicate the traffic object intents to enter the intersection. The possession score increases where the traffic regulations and/or behavior parameters indicate the alternative. Where the possession score exceeds the threshold, which may correspond to a weighted value where the likelihood that the autonomous vehicle 102 possesses the right of way is high, the autonomous vehicle 102 may generate a decision autonomously to enter the intersection. Where the possession score is lower than the threshold, the vehicle controller 304 may generate a decision autonomously to remain stopped at the intersection. In some cases, an occupant of the autonomous vehicle 102 may override the autonomous decision.

To communicate the intent of the autonomous vehicle 102, the vehicle controller 304 generates an intent icon 114 linked to an action of the autonomous vehicle 102. The action is correlated to the decision regarding whether the autonomous vehicle 102 will enter the intersection. The intent icon 114 may further be linked with a next step in the route following traversal of the intersection. For example, the intent icon may communicate that the autonomous vehicle 102 intends to traverse the crosswalk 108, enter the traffic intersection 106, and proceed straight after traversing the traffic intersection 106. The intent icon 114 may be presented to the external environment using the presentation system 306. In one implementation, the intent icon 114 is presented to the external environment proportional to a confidence of the perceived possession of the right of way.

The confidence may be determined based on the possession score. For example, if the possession score exceeds the threshold, the intent icon 114 indicating that the autonomous vehicle 102 intends to remain stopped at the intersections 108 and 110 may be replaced with a second intent icon 200 projected at a distance greater than the intent icon 114. The distance of the second intent icon 200 may correspond to how much the value of the possession score exceeds the threshold. Similarly, the intent icon 114 indicating that the autonomous vehicle 102 intends to remain stopped may be projected at a distance corresponding to how much the value of the possession score is lower than the threshold. While distances at which the intent icons 114 and 200 are presented is described in the examples of FIGS. 1-2, it will be appreciated that other visual icons or audio feedback may be used to communicate a confidence of the possession of the right of way and the intent of the autonomous vehicle 102. Based on the decision of whether to direct the autonomous vehicle 102 into the intersection, the vehicle controller 304 communicates with various subsystems of the autonomous vehicle 102 to autonomously execute the action(s) correlated with the decision.

Further, in some cases, the vehicle controller 304 may obtain navigation data, object types, behavior profiles, scan data, traffic regulation data, and/or other raw or processed data over a network. In one implementation, the network is used by one or more computing or data storage devices, including one or more databases, for providing or otherwise accessing relevant information for navigating the autonomous vehicle, detecting and determining positions of traffic objects, generating a perceived right of way, determining whether to proceed into an intersection, determining actions of the autonomous vehicle 102, and/or generating intent icons. The presentation system 306 may be deployed in a mobile device and in communication with the vehicle controller 304 over the network. A server may also host a website or an application that users visit to access information stored in the databases and/or for accessing or interacting with the intent communication system 300. The server may be one single server, a plurality of servers with each such server being a physical server or a virtual machine, or a collection of both physical servers and virtual machines. In another implementation, a cloud hosts one or more network components. The vehicle controller 304, the server, the sensor system 302, the presentation system 206, and other resources, such as the database or user devices, connected to the network may access one or more other servers or resources for access to one or more websites, information, web services interfaces, autonomous vehicles, and/or other services or information. The server may also host a search engine for accessing and modifying such information.

In one implementation, the autonomous vehicle 102 autonomously approaches the intersection 106 and autonomously navigates to a stop proximal the intersection 106. While stopped proximal to the intersection 106, the intent communication system 300 projects an intent icon 114 onto pavement at a first distance ahead of the autonomous vehicle 102 and calculates a possession score for possession of right of way of the autonomous vehicle 102 to enter the intersection 106 based on the objects detected in a field around the autonomous vehicle 102. The intent communication system 300 projects the intent icon 200 onto pavement at distances ahead of the autonomous vehicle 102 proportional to the possession score and greater than the first distance. In response to the possession score exceeding a threshold score, the autonomous vehicle 102 autonomously enters the intersection 106.

In some implementations, while slowing upon approach to the intersection 106, the intent communication system 300 projects the intent icon 114 onto pavement at a distance ahead of the autonomous vehicle 102 proportional to a speed of the autonomous vehicle 102. While stopped proximal to the intersection, the intent communication system 300 projects the intent icon 114 onto pavement at a first distance ahead of the autonomous vehicle 102. The intent communication system 300 predicts possession of right of way of the autonomous vehicle 102 to enter the intersection 106 based on objects detected in a field around the autonomous vehicle 102. In preparation for navigating into the intersection, the intent communication system 300 projects the intent icon 200 onto pavement at a second distance ahead of the autonomous vehicle 102 greater than the first distance, and the autonomous vehicle 102 autonomously enters the intersection.

As described herein, the intent communication system 300 visually indicates an intent of the autonomous vehicle 102 external, for example to other vehicles, vehicle operators, and pedestrians nearby, through a simple intent icon projected onto nearby pavement. In one implementation, rather than project complex text or scenario-specific symbols onto pavement or render complex text or scenario-specific symbols on displays integrated into the autonomous vehicle 102, the intent communication system 300 projects a simple intent icon (e.g., a green circle or "dot" approximately 25-centimeters in diameter) onto nearby pavement at distances from the autonomous vehicle 102 that correspond to the intent to advance forward from the current location, such as into an intersection (e.g., a traffic intersection, a turn lane, out of or into a parking space, crosswalk, etc.). By projecting a simple intent icon into the surrounding field at positions (i.e., distances from the autonomous vehicle) linked to the autonomous vehicle intent to remain stopped or advance forward, the intent communication system 300 enables other vehicle operators and pedestrians nearby to quickly intuit the next action of the autonomous vehicle 102 and its perception of the field (e.g., whether the autonomous vehicle "sees" other vehicles and pedestrians).

In one implementation, the intent communication system 300 simulates eye contact, body language, and gestures between human operators of road vehicles and between vehicle operators and pedestrians nearby via a simple intent icon projected onto pavement near the autonomous vehicle. For example, the pedestrian 112 standing on a sidewalk may look down, such as at her phone, or elsewhere if she intends to remain in her current location rather than walk forward. However, the pedestrian 112 may naturally look up from her smartphone and/or in the direction she intends to walk when she eventually does intend to walk forward across the crosswalk 108. In one implementation, the intent communication system 300 mimics this behavior, including: projecting the intent icon 114 onto the pavement just ahead of the autonomous vehicle 102 when the autonomous vehicle 102 intends to remain stopped in its current location (e.g., at a traffic light, a stop sign, a crosswalk, a turn lane, a parking space); and projecting the intent icon 200 further ahead of the front of the autonomous vehicle 102 when the autonomous vehicle 102 intends to move forward. Human operators and pedestrians nearby may: witness the intent icon 114; intuit the autonomous vehicle intent to remain stopped when the projected intent icon 114 remains close to the autonomous vehicle 102, since the intent icon 114 position may simulate a user looking down at her phone; and intuit the increasing intent of the autonomous vehicle 102 to move forward (or backward, such as out of a parking space) as the autonomous vehicle 102 projects the intent icon 200 at greater distances from the autonomous vehicle 102, since this intent icon position may simulate a user looking up from her phone when preparing to move from her current location. The presently disclosed technology thus enables vehicle operators, pedestrians, other autonomous vehicles, and/or the like nearby to quickly comprehend the autonomous vehicle intent (e.g., its next elected action) without reading complex textual content, interpreting scenario-specific icons, or otherwise holding prior knowledge of such language or iconography projected or rendered by other autonomous vehicles.

The intent communication system 300 projects the intent icons 114, 200 onto pavement in the field near the autonomous vehicle 102 to communicate the perception of the autonomous vehicle 102 of its field, its perception of its right of way, and its intent, which may further include a next step in a route following traversal of the intersection. For example, the intent icons 114, 200 may be projected in combination with left and right turn signals integrated into the autonomous vehicle 102. The autonomous vehicle 102 in some cases may render a similar intent icon on exterior displays integrated into the autonomous vehicle 102. Furthermore, the autonomous vehicle 102 may be a dedicated autonomous rideshare vehicle, an autonomous personal mobility vehicle, an autonomous fleet vehicle, an autonomous delivery or other commercial-type vehicle, an autonomous truck, etc.

As the autonomous vehicle 102 autonomously navigates on the travel path 104 along the route, the sensor system 302 continuously, regularly, intermittently, or upon prompt captures scan data of the field. The sensor system 302 includes a suite of one or more sensors configured to collect information about the environment of the autonomous vehicle 102. In one implementation, the sensor system 302 includes a set of 360° LIDAR sensors arranged on the autonomous vehicle 102. For example, one LIDAR sensor may be arranged at the front of the autonomous vehicle 102, and a second LIDAR sensor may be arranged at the rear of the autonomous vehicle 102. In another example, a cluster of LIDAR sensors may be arranged on the roof of the autonomous vehicle 102. Each LIDAR sensor can output one three-dimensional distance map (or depth image)—such as in the form of a 3D point cloud representing distances between the LIDAR sensor and external surface within the field of view of the LIDAR sensor—per rotation of the LIDAR sensor (i.e., once per scan cycle). The sensor system 302 may additionally or alternatively include: a set of infrared emitters configured to project structured light into the field near the autonomous vehicle 102; a set of infrared detectors (e.g., infrared cameras); and/or the like.

In one implementation, the sensor system 302 includes one or more color cameras facing outwardly from the front, rear, left lateral side, right lateral, and/or other locations of the autonomous vehicle 102. Each camera can output a video feed containing a sequence of digital photographic images (or "frames"), such as at a rate of 20 Hz. The sensor system 302 may alternatively or additionally include a set of infrared proximity sensors arranged along the perimeter of the base of the autonomous vehicle 102 and configured to output signals corresponding to proximity of objects within one meter or other distance of the autonomous vehicle 102.

The sensor system 302, the vehicle controller 304, and/or other computing units may fuse data streams from the LIDAR sensor(s), the color camera(s), the proximity sensor(s), and/or other sensors into one optical scan of the field around the autonomous vehicle—such as in the form of a 3D color map or 3D point cloud of roads, sidewalks, vehicles, pedestrians, and/or other features and objects in the field around the autonomous vehicle 102—per scan cycle. The sensor system 102, the vehicle controller 304, or other computing unit may similarly transform images output by the infrared detector(s) into a depth map of the field. In some implementations, the autonomous vehicle 102 collects scan data and other data broadcast by other vehicles and/or static sensor systems over the network and incorporates the collected data into an optical scan to determine a state and context of the field to elect subsequent control operations.

The intent communication system 300 may utilize a navigation map, localization map, and/or the like in determining control operations, navigation, and other autonomous decisions.

The maps may be stored in local memory of the intent communication system 300 and/or acquired over the network. The navigation map defines a route for execution by the autonomous vehicle 102, and the localization map is used to determine a location of the autonomous vehicle 102 in real space. In one implementation, the vehicle controller 304: determines the location of the autonomous vehicle 102 in real space based on sensor data collected from the sensor system 302 and the localization map; determines the context of the field around the autonomous vehicle 102 based on these sensor data; determines a control operation or action (e.g., a navigational decision) based on the context of the field around the autonomous vehicle 102, the real location of the autonomous vehicle (e.g., determined using the localization map), and the navigation map. The vehicle controller 304 may implement a deep learning and/or artificial intelligence model in generating these determinations. The control operations are autonomously executed using the subsystems 204 within the vehicle (e.g., accelerator, brake, and steering actuators). In one implementation, the vehicle controller 304 compares features extracted from the optical scan to like features represented in the localization map to determine the geospatial location and orientation of the autonomous vehicle 102 in real space. The vehicle controller 304 uses this information to elect a control operation accordingly.

The intent communication system 300 may further implement a perception model, including, without limitation, integrated or discrete vehicle, pedestrian, traffic sign, traffic signal, and lane marker detection models, to detect and identify objects in the field associated with the intersections. The vehicle controller 304 may implement a navigation or path planning model (e.g., in the form of a convolutional neural network) to elect acceleration, braking, turning actions and/or other control operations based on the objects and the route of the autonomous vehicle 102.

It will be appreciated that the autonomous vehicle 102 can include any other types of sensors and can implement any other scanning, signal processing, and autonomous navigation techniques or models to determine its geospatial position and orientation, to perceive objects in its vicinity, and to elect control operations based on sensor data collected through these sensors.

In some cases the intent communication system 300 implements the localization map, the navigational model, and a path planning model to: autonomously navigate the autonomous vehicle 102 to approach an intersection; detect a stop sign, yield sign, or traffic signal near the intersection; detect another vehicle, pedestrian, or other traffic object near this intersection; perceive that another of the traffic objects has right of way to enter the intersection or that the autonomous vehicle 102 is otherwise required to stop at the intersection; and autonomously navigate the autonomous vehicle 102 to a stop proximal to the intersection. As the autonomous vehicle 102 slows upon approach to the intersection, while the autonomous vehicle 102 is stopped at the intersection, and/or as the autonomous vehicle 102 then accelerates into the intersection, the intent communication system 300 visually communicates the autonomous vehicle intent by projecting the intent icon 114/200 onto pavement nearby.

The presentation system 306 may include one or more projects to communicate intent of the autonomous vehicle 102 corresponding to current and/or upcoming actions. In one implementation, the presentation system 306 includes a front projector configured to project light onto pavement ahead of the autonomous vehicle 102. For example, the front projector can include a DLP or LCD projector arranged under or integrated into the front bumper of the autonomous vehicle 102 and configured to project light over a distance ahead of the autonomous vehicle 102, such as including from 50 centimeters ahead of the autonomous vehicle 102 to five meters ahead of the autonomous vehicle 102. Alternatively, the front projector can be configured to output a beam of light (e.g., an approximately-collimated light beam) and can be pivotably mounted to the front of the autonomous vehicle 102 to project the beam of light along a length of pavement ahead of the autonomous vehicle 102. However, the forward project can be mounted to or integrated into the autonomous vehicle 102 in any other way, can include a light source of any other type, and can project light into the field at varying distances from the front of the autonomous vehicle in any other way. The presentation system 306 may similarly include: a rear projector configured to project light onto pavement behind the autonomous vehicle 102; a right projector configured to project light onto pavement to the right of the autonomous vehicle 102; and/or a left projector configured to project light onto pavement to the left of the autonomous vehicle 102.

While stopped proximal the intersection, in one implementation, intent communication system 300: projects an intent icon onto pavement at a first distance ahead of the autonomous vehicle; calculates a possession score for possession of right of way of the autonomous vehicle 106 to enter the intersection based on objects detected in a field around the autonomous vehicle 102; projects the intent icon onto pavement at distances ahead of the autonomous vehicle 102 proportional to the possession score and greater than the first distance. Generally, the intent communication system 300 projects the intent icon onto pavement near the autonomous vehicle 102 at a distance from the autonomous vehicle 102 (or at a position relative to the autonomous vehicle 102) that corresponds to the autonomous vehicle intent to either remain stopped in the current location or to enter the intersection. In particular, the intent communication system 300 projects a simple intent icon from which a human or autonomous machine nearby may quickly intuit the autonomous vehicle intent to either remain stopped or to move from the current location.

In one implementation, intent communication system 300 projects a circular "dot"—such as approximately 25 centimeters in diameter and in a solid color (e.g., white, orange, green, yellow, violet, pink)—onto pavement near the autonomous vehicle 102. The intent communication system 300 may also animate the intent icon in order to garner attention from traffic objects. For example, the intent communication system 300 may pulsate the intent icon 114/200, including expanding and contracting the projected intent icon 114/200 by +/−30% of the nominal diameter, to increase likelihood that the intent icon 114/200 will be noticed. In one implementation, the intent communication system 300 may also pulsate the intent icon 114/200 at a rate corresponding to the intended rate of acceleration or deceleration from the current location.

In another implementation, intent communication system 300 projects the intent icon 114/200 in the form of a "dot" into the field with a "tail" trailing the dot back to the autonomous vehicle 102 to visually link the projected dot to the autonomous vehicle 102, thereby distinguishing from other autonomous vehicles nearby that may be implementing similar methods and techniques to project their own intent icons onto pavement nearby (e.g., when multiple autonomous vehicles converge on one intersection). In a similar implementation, the intent communication system 300 may project the intent icon 114/200 that defines a tapered line or arc extending from the autonomous vehicle 102 and widening at greater distances from the autonomous vehicle 102.

The intent communication system 300 may also project the intent icon 114/200 in a color matched to the exterior color or a graphic on the exterior of the autonomous vehicle 102. For example, the autonomous vehicle 102: may include green and yellow graphics arranged on the exterior; and may project a circular intent icon with concentric green and yellow rings onto pavement nearby in order to enable traffic objects nearby to visually link the projected intent icon to the autonomous vehicle 102. In this example, a second autonomous vehicle: may include orange and white graphics arranged on the exterior; and may project a circular intent icon with concentric orange and white rings onto pavement nearby in order to enable traffic objects nearby to visually link the projected intent icon to the second autonomous vehicle and to distinguish the intent icon projected by the second autonomous vehicle from intent icons projected by other autonomous vehicles nearby. However, the intent communication system 300 may project an intent icon of any other size, geometry, and/or color, etc. and animated in any other way.

Generally, the intent communication system 300 may activate a front projector to project the intent icon into the field nearby in select scenarios, for example, when the autonomous vehicle 102 is preparing to execute certain actions. Once the autonomous vehicle 102 begins to autonomously navigate forward into an intersection, the intent communication system 300 may deactivate projection of the intent icon into the field. In one implementation, the intent communication system 300 may continue to project the intent icon until the autonomous vehicle 102 has exited the intersection or otherwise completed the current navigational action. In another implementation, the intent communication system 300 may disable projection of the intent icon at the earlier of: reaching a threshold speed (e.g., 10 miles per hour, 25 miles per hour); and coming within a threshold distance (e.g., five meters) of another vehicle directly ahead of the autonomous vehicle.

The intent communication system 300 may also disable projection of the intent icon when the autonomous vehicle 102 is behind another vehicle and approaching or stopped at an intersection. The intent communication system 300 may limit projection of the intent icon into the field to when the autonomous vehicle 102 reaches the front of intersection (i.e., is the leading vehicle in the lane at the intersection). However, the intent communication system 300 may selectively disable projection of the intent icon in response to any other event.

In some implementations, the intent communication system 300 may project the intent icon into the field along a longitudinal axis of the autonomous vehicle 102 and at varying distances from the autonomous vehicle 102 and leverage turn signals integrated into the autonomous vehicle 102 to indicate the autonomous vehicle intended direction of navigation. In other implementations, when preparing to execute a turn at an intersection, for example such as when stopped at a stoplight, traffic signal, or turn lane, the intent communication system 300 may shift the projected intent icon laterally (i.e., off of the longitudinal axis of the autonomous vehicle 102) to visually communicate the autonomous vehicle intent to execute the turn. In particular, by projecting the intent icon in the direction that the autonomous vehicle 102 intends to navigate while also projecting the intent icon at a distance from the autonomous vehicle 102 corresponding to the autonomous vehicle intent to execute the navigational action, the intent communication system 300 may move the intent icon closer to another traffic object nearer to the autonomous vehicle intended path, which may improve perception and comprehension of the intent icon for traffic objects.

In one particular example implementation where the intersection is the traffic intersection 106 including a stop sign, the intent communication system 300 activates a front projector of the presentation system 306 to project the intent icon into the field upon stopping at a stop sign and preparing to move into the traffic intersection 106 ahead. In one implementation, the autonomous vehicle 102 may implement autonomous navigation and perception techniques to: autonomously navigate along the travel path 104; detect a stop sign ahead of the autonomous vehicle 102; slow upon approach to the stop sign; stop at or ahead of the traffic intersection 106; detect and track other vehicles 110 at the intersection 106; perceive right of way of these vehicles 110 based on detected arrival times at the intersection 106; and remain stopped at the intersection 106 while waiting for other vehicles with a right of way preceding that of the autonomous vehicle 102 to enter the intersection 106.

While stopped at the stop sign and waiting for other vehicles 110 to enter the intersection 106 before entering the intersection 106, the intent communication system 300 may activate the front projector to project the intent icon 114 just ahead (e.g., within 50 centimeters) of the front bumper of the autonomous vehicle 102. During this period, the intent communication system 300 may continue to: scan the surrounding field for other vehicles; track locations of these other vehicles at and near the intersection 106; and derive the right of way of the autonomous vehicle 102 to enter the intersection. As the intent communication system 300 detects a last other vehicle 110 with right of way preceding that of the autonomous vehicle 102 entering the intersection 106, the intent communication system 300 may trigger the front projector to move the intent icon 200 further ahead of the front of the autonomous vehicle 102 to visually indicate the autonomous vehicle intent to enter the intersection 106. For example, the front projector may "animate" the intent icon 114 at the projected position proximal to the front bumper of the autonomous vehicle 102 as the intent icon 200 moves to a position further ahead of the autonomous vehicle 102 such as in the intersection 106 to visually indicate the autonomous vehicle intent to advance into the intersection 106 soon thereafter.

In one implementation, the intent communication system 300 may also: calculate a possession score that the autonomous vehicle 102 possesses right of way to enter the intersection 106 based on presence of other vehicles 110 in or near the intersection; project the intent icon 200 into the field at a distance from the front of the autonomous vehicle 102 as a function of the possession score; and enter the intersection 106 and resume navigation once the possession score exceeds a threshold score. The intent communication system 300 may project the intent icon 200 at a distance ahead of the autonomous vehicle as a function of the autonomous vehicle confidence in the right of way, which may correspond to the intent to enter the intersection 106.

In one particular example implementation where the intersection is the crosswalk 108, the intent communication system 300 activates a front projector of the presentation system 306 to project the intent icon 114 into the field upon stopping ahead of the crosswalk 108 and preparing to advance through the crosswalk 108. In one implementation, the autonomous vehicle 102 may execute methods and techniques similar to those described herein to: autonomously navigate along the travel path 104; detect the crosswalk 108 ahead of the autonomous vehicle 102; detect and track the pedestrian 112 near the crosswalk 108; slow to a stop at or ahead of the crosswalk 108; and remain stopped at the crosswalk 108 while waiting for the pedestrian 112 to enter and then exit the crosswalk 108. While stopped at the crosswalk and waiting for the pedestrian 112 to exit the crosswalk, the intent communication system 300 may activate the front projector to project the intent icon 114 just ahead of the front bumper of the autonomous vehicle 102 to visually communicate to the pedestrian 112 that the autonomous vehicle 102 intends to remain stopped at the crosswalk 108 for the pedestrian 112.

The intent communication system 300 may continue to track the pedestrian 112 moving through the crosswalk 108. As the pedestrian 112 approaches an adjacent sidewalk (or median) or once the pedestrian 112 steps onto the sidewalk (or median), the intent communication system 300 may move the intent icon 200 further ahead of the autonomous vehicle 102 to visually indicate the autonomous vehicle intent to advance past the crosswalk 108. For example, the intent communication system 300: estimates a remaining time for the pedestrian 112 to reach the adjacent sidewalk based on a speed of the pedestrian 112 and a remaining distance between the pedestrian 112 and the sidewalk; animate the intent icon 200 moving outwardly from the autonomous vehicle 102 (e.g., into or past the crosswalk 108) once the intent communication system 300 estimates the pedestrian 112 to be within a threshold time (e.g., four seconds) of the sidewalk; and continue to move the intent icon 200 outwardly from the front of the autonomous vehicle 102 as the pedestrian 112 approaches the sidewalk to visually communicate a sense of "urgency" and to visually indicate the autonomous vehicle intent to pass through the crosswalk 108 once the pedestrian enters the sidewalk.

In one implementation, the intent communication system 300: calculates a possession score that it possesses right of way to enter the crosswalk 108 based on presence of the pedestrian 112 in or near the crosswalk; projects the intent icon 200 into the field at a distance from the front of the autonomous vehicle 102 as a function of the possession score; and directs the autonomous vehicle 102 to move through the crosswalk 108 once the possession score exceeds a threshold score. The intent communication system 300 may project the intent icon 200 at a distance ahead of the autonomous vehicle 102 as a function of the autonomous vehicle confidence in the right of way, which may correspond to the intent to enter the crosswalk 108.

In one particular example implementation where the intersection includes a right turn lane of a traffic intersection, the intent communication system 300 activates a front projector of the presentation system 306 to project the intent icon 114 into the field upon stopping at a right turn lane and preparing to turn right. In one implementation, the autonomous vehicle 102 may execute methods and techniques similar to those described herein to: autonomously navigate along a travel path, up to a traffic intersection and into a right-turn lane; detect and track other vehicles in or approaching the intersection; identify another vehicle heading toward the road segment just ahead of and perpendicular to the autonomous vehicle 102 and with right of way to pass through the intersection; and yield to the other vehicle accordingly. While stopped in the right turn late and waiting for the other vehicle to pass the autonomous vehicle 102, the intent communication system 300 may activate the front projector to project the intent icon 114 just ahead of the front bumper of the autonomous vehicle 102 to visually communicate to the other traffic objects that the autonomous vehicle 102 intends to remain stopped in the right-turn lane for the other vehicle to pass.

The intent communication system 300 may continue to track the other vehicle and may move the intent icon 200 further ahead of the autonomous vehicle to visually indicate the autonomous vehicle intent to turn right from the right-turn lane once the other vehicle passes in front of the autonomous vehicle. In a similar example, the intent communication system 300 may: estimate a remaining time for the other vehicle to pass the autonomous vehicle 102 based on the position and speed of the other vehicle relative to the autonomous vehicle 102; animate the intent icon 200 moving outwardly from the autonomous vehicle 102 (e.g., into the road segment ahead of and perpendicular to the autonomous vehicle 102) once the intent communication system 300 estimates the other vehicle to be within a threshold time (e.g., two seconds) of passing the autonomous vehicle 102; and continue to move the intent icon 200 outwardly from the front of the autonomous vehicle 102 as the other vehicle passes and moves beyond the autonomous vehicle 102. Once the intent communication system 300 determines that the other vehicle has moved beyond the autonomous vehicle 102 by at least a minimum distance and that other vehicles are not approaching the road segment just ahead of the autonomous vehicle 102, the autonomous vehicle 102 may resume autonomous navigate and execute a right-turn action onto the road segment.

In one implementation, the intent communication system 300: calculates a possession score that the autonomous vehicle 102 possesses right of way to make a right turn at the intersection based on presence of other vehicles nearby; projects the intent icon 200 into the field at a distance from the front of the autonomous vehicle 102 as a function of the possession score; and directs the autonomous vehicle 102 to autonomously execute a right-turn action once the possession score exceeds a threshold score. The intent communication system 300 may project the intent icon 200 at a distance ahead of the autonomous vehicle 102 as a function of the autonomous vehicle confidence in the right of way, which may correspond to the intent to execute a right turn action.

In one particular example implementation, the intersection includes a parking space (e.g., another vehicle is approaching the same parking space as the autonomous vehicle 102, another vehicle is pulling out of a parking space into a lane the autonomous vehicle 102 is in, another vehicle is coming towards the autonomous vehicle 102 in the same lane as the autonomous vehicle 102 intends to pull into a parking space, the autonomous vehicle 102 is backing out of a parking space into a lane, and/or other scenarios involving intersecting traffic paths in the context of a parking space). In one such example, the intent communication system 300 activates a rear projector to project the intent icon into the field when stopped in a parking space and preparing to back out of the parking space. In one implementation, the autonomous vehicle 102 may remain parked in a parking space with the powertrain "OFF" when not in use (e.g., when "idle"). When a user subsequently enters the autonomous vehicle 102 in preparation for a ride to a dropoff location or when the autonomous vehicle 102 receives a new ride request specifying a pickup location other than the parking space, the autonomous vehicle 102 may: power up the powertrain; activate the rear projector using the intent communication system 300 to project the intent icon just behind the rear bumper of the autonomous vehicle 102 to visually communicate to traffic objects that the autonomous vehicle 102 is active but intends to remain stopped in the current parking space; and scan the field behind and to the sides of the autonomous vehicle 102 for an approaching vehicle, a pedestrian, and/or other traffic object.

If the intent communication system 300 detects an approaching traffic object within a threshold distance of a planned path out of the parking space, the autonomous vehicle 102 may remain stopped in the parking space and continue to project the intent icon just behind the rear bumper of the autonomous vehicle 102 via the rear projector of the presentation system 306. As the traffic object passes the parking space of the autonomous vehicle 102 and/or moves outside of the planned path of the autonomous vehicle 102 out of the parking space, the intent communication system 300 project the intent icon further from the rear of the autonomous vehicle 102 to visually communicate the intent to back out of the parking space. Once the autonomous vehicle confirms that other traffic objects are sufficiently remote from all or a portion of the planned path out of the parking space, the autonomous vehicle 102 may autonomously back out of the parking space along the planned path.

In one implementation, the intent communication system 300 may: calculate a possession score that the autonomous vehicle 102 possesses right of way to back out of the parking space based on presence of other traffic objects nearby; projects the intent icon into the field at a distance behind the autonomous vehicle 102 as a function of the possession score; and then directs the autonomous vehicle 102 to autonomously navigate a planned path to back out of the parking space once the possession score exceeds a threshold score. The intent communication system 300 may project the intent icon at a distance behind the autonomous vehicle 102 as a function of the autonomous vehicle confidence in the right of way, which may correspond to the intent to back out of the parking space.

Furthermore, as the autonomous vehicle 102 approaches the end of the planned path out of the parking space, the intent communication system 300 may shift the intent icon closer to the rear of the autonomous vehicle 102 to communicate the autonomous vehicle intent to slow and then change directions. For example, a rear projector of the presentation system 306 may project the intent icon at a distance from the rear of the autonomous vehicle 102 as an inverse function of the distance remaining along the planned path or as a function of the autonomous vehicle intended speed.

As (or once) the autonomous vehicle 102 slows to a stop at the end of the planned path out of the parking space, the intent communication system 300 may: deactivate the rear projector and trigger the front projector to project the intent icon proximal the front of the autonomous vehicle 102 while scanning the field ahead of the autonomous vehicle 102 for another vehicle or pedestrian. Once the intent communication system 300 confirms that the autonomous vehicle 102 has right of way to move forward, such as in the absence of another traffic object in or near a planned route forward from the current location of the autonomous vehicle 102, the front projector may move the intent icon further ahead of the front of the autonomous vehicle 102 to communicate the autonomous vehicle intent to move forward, as described herein.

In one implementation, the intent communication system 300 is used in the context of a ride share program where the intersection involves a rider pickup or drop off location along one or more lanes of traffic. In one particular example implementation involving such a ride share program, while stopped at a pickup location, such as a curb or loading zone, and waiting for a rider to enter the autonomous vehicle 102, a side projector of the presentation system 306 of the intent communication system 300 projects the intent icon onto pavement adjacent a door of the autonomous vehicle 102 to visually communicate to other traffic objects nearby that the autonomous vehicle 102 is waiting for a rider to enter the autonomous vehicle 102. Once the rider has entered the autonomous vehicle 102, the intent communication system 300 may animate the intent icon moving toward the front of the autonomous vehicle 102 and project the intent icon adjacent the front of the autonomous vehicle 102 while the rider prepares for departure. Once the rider confirms that she is ready to depart and as the intent communication system 300 verifies that the autonomous vehicle verifies possesses right of way, the intent communication system 300 may project the intent icon at greater distances from the front of the autonomous vehicle 102 to visually communicate the intent to depart from the pickup location.

Similarly, as the autonomous vehicle 102 approaches a drop-off location, the intent communication system 300 may project the intent icon ahead of the autonomous vehicle 102 and shift the intent icon closer to the front of the autonomous vehicle 102 to visually communicate the intent to slow down. After stopping at the drop off location and while waiting for a rider to exit the autonomous vehicle 102, the intent communication system 300 may shift the intent icon to pavement adjacent a door of the autonomous vehicle 102 (e.g., adjacent the rider's location inside the autonomous vehicle 102 or adjacent a door of the autonomous vehicle 102 opposite a nearby curb) to visually communicate to other traffic objects nearby that the autonomous vehicle 102 is waiting for a rider to exit the autonomous vehicle 102. The autonomous vehicle 102 may then transition the intent icon back to the front of the autonomous vehicle 102 in preparation for subsequent departure, as described herein.

The intent communication system 300 may implement similar methods and techniques to activate a front projector when approaching select scenarios or when preparing to execute a navigational change. In one example, as the autonomous vehicle 102 approaches a right turn lane and prepares to turn right, the intent communication system 300 may project the intent icon onto pavement far (e.g., five meters) ahead of the autonomous vehicle 102 once the speed of the autonomous vehicle 102 drops below a speed threshold (e.g., 25 miles per hour). The intent communication system 300 may project the intent icon onto pavement at closer distances to the front of the autonomous vehicle 102 as the autonomous vehicle 102 slows further upon approach to the right turn lane. If the autonomous vehicle 102 then stops in the right turn lane to yield to oncoming traffic, the intent communication system 300 may implement methods and techniques described herein to project the intent icon in the front of the autonomous vehicle 102 while stopped and to then shift the intent icon further ahead of the autonomous vehicle 102 as the autonomous vehicle prepares to advance forward and execute a right turn maneuver. However, if the intent communication system 300 determines that no traffic is oncoming and prepares to execute the right turn maneuver as the autonomous vehicle 102 approaches the right turn lane without stopping, the intent communication system 300 may then transition to projecting the intent icon at a further distance from the front of the autonomous vehicle 102, even as the autonomous vehicle 102 slows upon approach to the right turn lane, to visually communicate the autonomous vehicle intent to execute the right turn maneuver without stopping.

Figure 4:
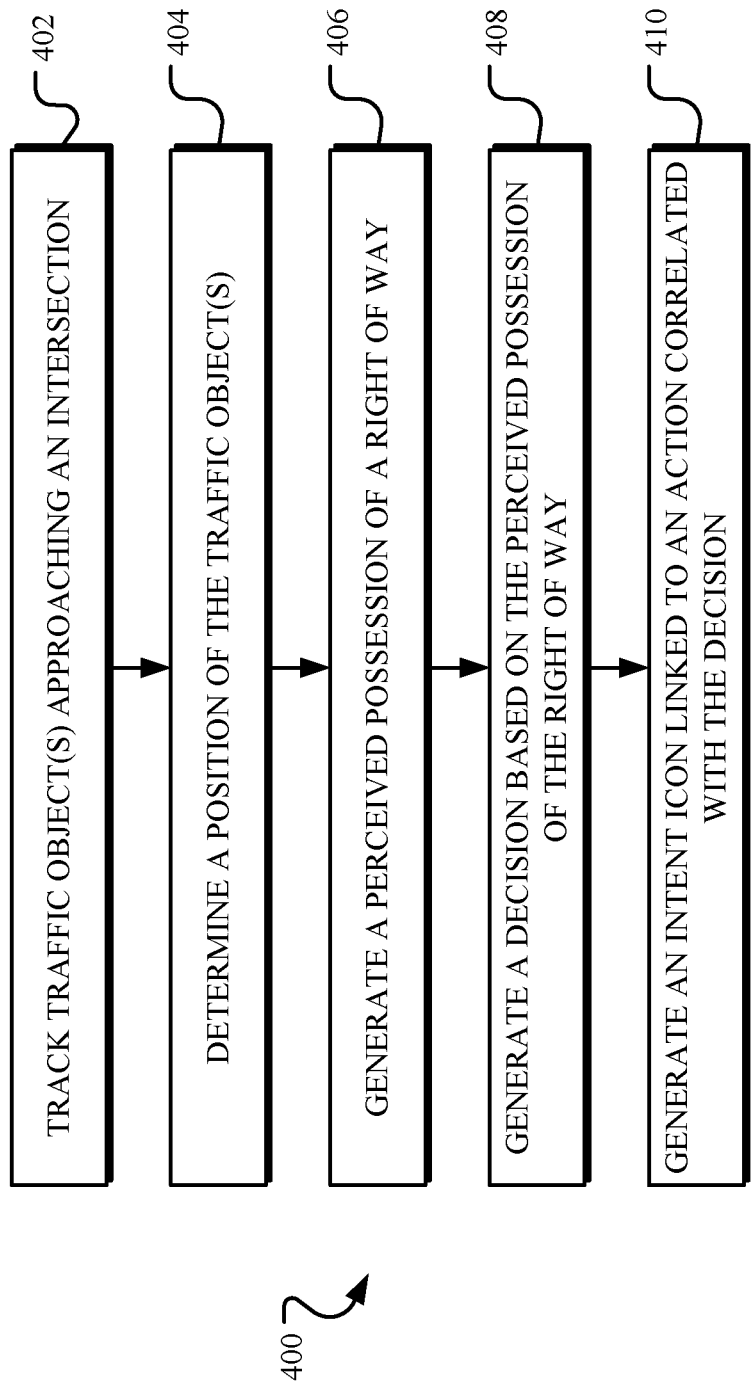
FIG. 4 illustrates example operations for communicating an intent of an autonomous vehicle externally.

Turning to FIG. 4, example operations 400 for communicating an intent of an autonomous vehicle externally. In one implementation, an operation 402 tracks at least one traffic object approaching an intersection towards which an autonomous vehicle autonomously navigates along a travel path. The intersection may include a traffic intersection, a crosswalk, a space in a parking lot, and/or other areas having intersecting travel paths. The traffic object(s) may include a pedestrian, a vehicle, a personal vehicle, and/or other objects that impact a possession of a right of way for the autonomous vehicle. An operation 404 determines a position of the traffic object (s) relative to the intersection when the autonomous vehicle is stopped at the intersection.

In one implementation, an operation 406 generates a perceived possession of a right of way of the autonomous vehicle to enter the intersection based on the position of the traffic object(s) relative to the intersection when the autonomous vehicle is stopped at the intersection. An operation 408 generates a decision of whether to direct the autonomous vehicle into the intersection based on the perceived possession of the right of way. The perceived possession of a right of way of the autonomous vehicle to enter the intersection may be generated based on whether the position of the at least one traffic object includes: the at least one traffic object moving towards the intersection; the at least one traffic object moving through the intersection; the at least one traffic object moving away from the intersection; and/or or the at least one traffic object is stopped at the intersection.

The perceived possession of the right of way of the autonomous vehicle to enter the intersection may be generated based on a comparison of a possession score to a threshold, and the decision may include directing the autonomous vehicle into the intersection when the possession score exceeds the threshold. In one implementation, the possession score is further determined based on an object type of the traffic object and a behavior profile associated with the object type, at least one traffic regulation associated with the intersection, and/or the like.

An operation 410 generates an intent icon linked to an action of the autonomous vehicle, where the action is correlated with the decision of whether to direct the autonomous vehicle into the intersection. The action of the autonomous vehicle may be autonomously navigating the autonomous vehicle through the intersection or holding the autonomous vehicle in a stopped position at the intersection. The intent icon communicates the action of the autonomous vehicle to the environment external to the autonomous vehicle. The intent icon may be further linked to the behavior profile.

The intent icon may be presented to an environment external to the autonomous vehicle proportional to a confidence of the perceived possession of the right of way. The confidence of the perceived possession of the right of way may be determined based on a value of the possession score. The intent icon may be projected onto a surface at a distance proportional to the confidence of the perceived possession of the right of way. In one implementation, a first icon is projected on the surface at a first distance when the autonomous vehicle is stopped at the intersection, and the distance at which the intent icon is projected is greater that the first distance of the first icon.

Figure 5:
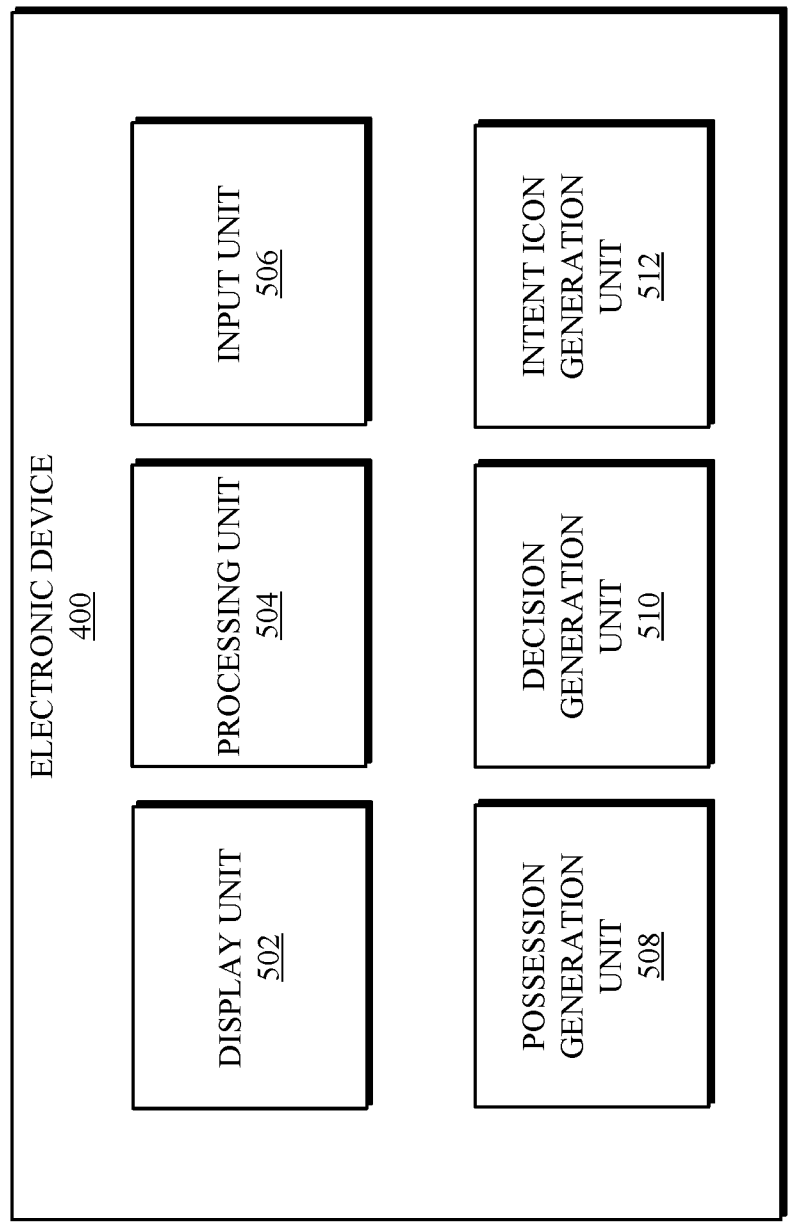
FIG. 5 is a functional block diagram of an electronic device including operational units arranged to perform various operations of the presently disclosed technology.

Turning to FIG. 5, an electronic device 500 including operational units 502-512 arranged to perform various operations of the presently disclosed technology is shown. The operational units 502-512 of the device 500 are implemented by hardware or a combination of hardware and software to carry out the principles of the present disclosure. It will be understood by persons of skill in the art that the operational units 502-512 described in FIG. 5 may be combined or separated into sub-blocks to implement the principles of the present disclosure. Therefore, the description herein supports any possible combination or separation or further definition of the operational units 502-512.

In one implementation, the electronic device 500 includes a display unit 502 configured to display information, such as a graphical user interface, and a processing unit 504 in communication with the display unit 802 and an input unit 506 configured to receive data from one or more input devices or systems. Various operations described herein may be implemented by the processing unit 504 using data received by the input unit 506 to output information for display using the display unit 502.

Additionally, in one implementation, the electronic device 500 includes units implementing the operations described with respect to FIG. 4. For example, the operation 406 may be implemented by a possession generation unit 508, the operation 408 may be implemented by a decision generation unit 510, and the operation 412 may be implemented with an intent icon generation unit. In some implementations, a controlling unit implements various operations for controlling the operation of a vehicle based on the operations implemented by the units 502-512.

Figure 6:
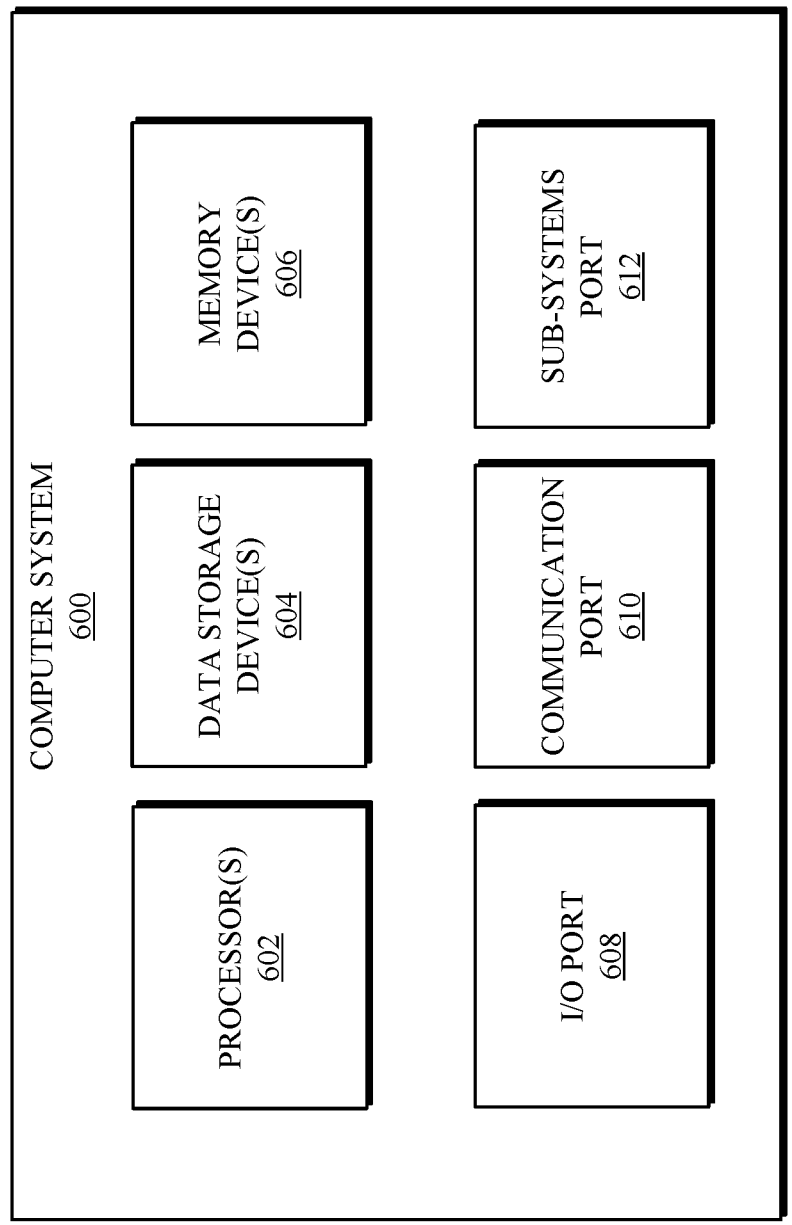
FIG. 6 is an example computing system that may implement various aspects of the presently disclosed technology.

Referring to FIG. 6, a detailed description of an example computing system 600 having one or more computing units that may implement various systems and methods discussed herein is provided. The computing system 600 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 606, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device(s) 606, and/or communicated via one or more of the ports 608-612, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G), fourth generation (4G) network, or fifth generation (5G)), network, or over another communication means. Further, the communication port 610 may communicate with an antenna for electromagnetic signal transmission and/or reception. In some examples, an antenna may be employed to receive Global Positioning System (GPS) data to facilitate determination of a location of a machine, vehicle, or another device.

The computer system 600 may include a sub-systems port 612 for communicating with one or more systems related to a vehicle to control an operation of the vehicle and/or exchange information between the computer system 600 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, traffic object information, profiles, possession information, icon information, and software and other modules and services may be embodied by instructions stored on the data storage devices 604 and/or the memory devices 606 and executed by the processor 602. The computer system 600 may be integrated with or otherwise form part of a vehicle. In some instances, the computer system 600 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid surface hazards. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of communicating an intent of an autonomous vehicle externally, the method comprising:
    navigating an autonomous vehicle autonomously along a travel path, the autonomous vehicle moving towards an intersection, the intersection defined by intersecting travel paths;
    tracking at least one traffic object approaching the intersection;
    determining a position of the at least one traffic object relative to the intersection when the autonomous vehicle is stopped at the intersection;
    generating a perceived possession of a right of way of the autonomous vehicle to enter the intersection based on the position of the at least one traffic object relative to the intersection when the autonomous vehicle is stopped at the intersection;
    generating a decision of whether to direct the autonomous vehicle into the intersection based on the perceived possession of the right of way;

generating an intent icon linked to an action of the autonomous vehicle, the action correlated with the decision of whether to direct the autonomous vehicle into the intersection;

presenting the intent icon to an environment external to the autonomous vehicle using a presentation system, the intent icon projected onto a surface at a distance proportional to a confidence of the perceived possession of the right of way, the intent icon communicating the action of the autonomous vehicle to the environment external to the autonomous vehicle; and autonomously executing the action of the autonomous vehicle following presentation of the intent icon.

2. The method of claim 1, further comprising:

identifying a next step in a route following a traversal through the intersection, the intent icon further linked to the next step in the route.

3. The method of claim 1, wherein the perceived possession of the right of way of the autonomous vehicle to enter the intersection is generated based on a comparison of a possession score to a threshold, the decision including directing the autonomous vehicle into the intersection when the possession score exceeds the threshold, the possession score determined based on the position of the at least one traffic object.

4. The method of claim 3, wherein the possession score is further determined based on an object type of the traffic object and a behavior profile associated with the object type, the intent icon further linked to the behavior profile.

5. The method of claim 3, wherein the possession score is further determined based on at least one traffic regulation associated with the intersection.

6. The method of claim 3, wherein the confidence of the perceived possession of the right of way is determined based on a value of the possession score.

7. The method of claim 1, wherein the perceived possession of a right of way of the autonomous vehicle to enter the intersection is generated based on whether the position of the at least one traffic object includes: the at least one traffic object moving towards the intersection; the at least one traffic object moving through the intersection; the at least one traffic object moving away from the intersection; or the at least one traffic object stopped at the intersection.

8. The method of claim 1, wherein the action of the autonomous vehicle includes autonomously navigating the autonomous vehicle through the intersection or holding the autonomous vehicle in a stopped position at the intersection.

9. The method of claim 1, wherein a first icon is projected on the surface at a first distance when the autonomous vehicle is stopped at the intersection, the distance at which the intent icon is projected being greater than the first distance of the first icon.

10. The method of claim 1, wherein the intersection includes a traffic intersection, a crosswalk, or a space in a parking lot.

11. The method of claim 1, wherein the at least one traffic object includes one or more of: a pedestrian, a vehicle, or a personal vehicle.

12. One or more tangible non-transitory computer-readable storage media storing computer-executable instructions for performing a computer process on a computing system, the computer process comprising:

tracking at least one traffic object approaching an intersection towards which an autonomous vehicle autonomously navigates along a travel path;

determining a position of the at least one traffic object relative to the intersection when the autonomous vehicle is stopped at the intersection;

generating a perceived possession of a right of way of the autonomous vehicle to enter the intersection based on the position of the at least one traffic object relative to the intersection when the autonomous vehicle is stopped at the intersection;

generating a decision of whether to direct the autonomous vehicle into the intersection based on the perceived possession of the right of way; and generating an intent icon linked to an action of the autonomous vehicle, the action correlated with the decision of whether to direct the autonomous vehicle into the intersection, the intent icon presented to an environment external to the autonomous vehicle using a presentation system, the intent icon projected onto a surface at a distance proportional to a confidence of the perceived possession of the right of way, the intent icon communicating the action of the autonomous vehicle to the environment external to the autonomous vehicle.

13. The one or more tangible non-transitory computer-readable storage media of claim 12, further comprising:

identifying a next step in a route following a traversal through the intersection, the intent icon further linked to the next step in the route.

14. The one or more tangible non-transitory computer-readable storage media of claim 12, wherein the perceived possession of the right of way of the autonomous vehicle to enter the intersection is generated based on a comparison of a possession score to a threshold, the decision including directing the autonomous vehicle into the intersection when the possession score exceeds the threshold.

15. The one or more tangible non-transitory computer-readable storage media of claim 14, wherein the possession score is determined based on the position of the at least one traffic object.

16. The one or more tangible non-transitory computer-readable storage media of claim 14, wherein the possession score is determined based on an object type of the traffic object and a behavior profile associated with the object type, the intent icon further linked to the behavior profile.

17. The one or more tangible non-transitory computer-readable storage media of claim 14, wherein the possession score is determined based on at least one traffic regulation associated with the intersection.

18. The one or more tangible non-transitory computer-readable storage media of claim 12, wherein a first icon is projected on the surface at a first distance when the autonomous vehicle is stopped at the intersection, the distance at which the intent icon is projected being greater than the first distance of the first icon.

19. The one or more tangible non-transitory computer-readable storage media of claim 12, wherein the perceived possession of a right of way of the autonomous vehicle to enter the intersection is generated based on whether the position of the at least one traffic object includes: the at least one traffic object moving towards the intersection; the at least one traffic object moving through the intersection; the at least one traffic object moving away from the intersection; or the at least one traffic object stopped at the intersection.

20. The one or more tangible non-transitory computer-readable storage media of claim 12, wherein the action of the autonomous vehicle includes autonomously navigating the autonomous vehicle through the intersection or holding the autonomous vehicle in a stopped position at the intersection.

21. The one or more tangible non-transitory computer-readable storage media of claim 12, wherein the intersection includes a traffic intersection, a crosswalk, or a space in a parking lot.

22. The one or more tangible non-transitory computer-readable storage media of claim 12, wherein the at least one traffic object includes one or more of: a pedestrian, a vehicle, or a personal vehicle.

23. A system of communicating an intent of an autonomous vehicle externally, the system comprising:
   a vehicle controller generating a perceived possession of a right of way of the autonomous vehicle to enter an intersection to towards which an autonomous vehicle autonomously navigates along a travel path, the perceived possession of the right of way generated based on a position of at least one traffic object relative to the intersection when the autonomous vehicle is stopped at the intersection, the vehicle controller generating a decision of whether to direct the autonomous vehicle into the intersection based on the perceived possession of the right of way; and
   a presentation system in communication with the vehicle controller, the presentation system presenting an intent icon to an environment external to the autonomous vehicle, the intent icon projected onto a surface at a distance proportional to a confidence of the perceived possession of the right of way, the intent icon communicating an action of the autonomous vehicle to the environment external to the autonomous vehicle, the action correlated with the decision of whether to direct the autonomous vehicle into the intersection, the action being autonomously executed by the autonomous vehicle following presentation of the intent icon.

24. The system of claim 23, wherein the perceived possession of the right of way of the autonomous vehicle to enter the intersection is generated based on a comparison of a possession score to a threshold, the decision including directing the autonomous vehicle into the intersection when the possession score exceeds the threshold.

25. The system of claim 24, wherein the possession score is determined based on the position of the at least one traffic object.

26. The system of claim 24, wherein the possession score is determined based on an object type of the traffic object and a behavior profile associated with the object type, the intent icon further linked to the behavior profile.

27. The system of claim 24, wherein the possession score is determined based on at least one traffic regulation associated with the intersection.

28. The system of claim 23, wherein the intent icon is further linked to a next step in a route following a traversal through the intersection.

29. The system of claim 23, wherein a first icon is projected on the surface at a first distance when the autonomous vehicle is stopped at the intersection, the distance at which the intent icon is projected being greater than the first distance of the first icon.

30. The system of claim 23, wherein the perceived possession of a right of way of the autonomous vehicle to enter the intersection is generated based on whether the position of the at least one traffic object includes: the at least one traffic object moving towards the intersection; the at least one traffic object moving through the intersection; the at least one traffic object moving away from the intersection; or the at least one traffic object stopped at the intersection.

31. The system of claim 23, wherein the action of the autonomous vehicle includes autonomously navigating the autonomous vehicle through the intersection or holding the autonomous vehicle in a stopped position at the intersection.

32. The system of claim 23, wherein the intersection includes a traffic intersection, a crosswalk, or a space in a parking lot.

33. The system of claim 23, wherein the at least one traffic object includes one or more of: a pedestrian, a vehicle, or a personal vehicle.

\* \* \* \* \*